United States Patent
Zhao et al.

(10) Patent No.: US 9,137,629 B2
(45) Date of Patent: Sep. 15, 2015

(54) APPARATUS AND METHODS FOR PROVIDING LOCATION-BASED SERVICES TO A MOBILE COMPUTING DEVICE HAVING A DUAL PROCESSOR ARCHITECTURE

(75) Inventors: Wen Zhao, Cupertino, CA (US); Isabel Ge, Los Altos, CA (US); Dan Myers, Fremont, CA (US); Arun Mathias, Sunnyvale, CA (US); Igor Braslavsky, San Jose, CA (US); Perry Zabaldo, San Diego, CA (US); Darren Lee Ang, Mountain View, CA (US); Craig Hamilton, Sunnyvale, CA (US); Eric Liu, Santa Clara, CA (US); Janell Paulson, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1024 days.

(21) Appl. No.: 11/469,374

(22) Filed: Aug. 31, 2006

(65) Prior Publication Data

US 2010/0285817 A1    Nov. 11, 2010

(51) Int. Cl.
*H04W 4/02* (2009.01)
*H04L 29/08* (2006.01)
*H04L 29/06* (2006.01)

(52) U.S. Cl.
CPC .............. *H04W 4/02* (2013.01); *H04L 67/18* (2013.01); *H04L 69/161* (2013.01); *H04L 69/16* (2013.01)

(58) Field of Classification Search
USPC ............ 370/338; 455/404.2, 414.2, 433, 440, 455/456.1–456.6; 712/1–300
See application file for complete search history.

(56) References Cited

U.S. PATENT DOCUMENTS

| | | | |
|---|---|---|---|
| 4,621,326 A | 11/1986 | Rawlins | |
| 5,365,450 A | 11/1994 | Schuchman et al. | |
| 5,422,813 A | 6/1995 | Schuchman et al. | |
| 5,726,893 A | 3/1998 | Schuchman et al. | |
| 6,621,420 B1 * | 9/2003 | Poursartip | 340/907 |
| 6,920,637 B2 | 7/2005 | Mason et al. | |
| 6,987,961 B1 * | 1/2006 | Pothana | 455/412.1 |
| 2002/0045437 A1 * | 4/2002 | Kesler | 455/411 |
| 2002/0183076 A1 * | 12/2002 | Pande et al. | 455/456 |
| 2003/0048288 A1 * | 3/2003 | Drif et al. | 345/705 |
| 2003/0054839 A1 * | 3/2003 | Ono | 455/456 |
| 2003/0073447 A1 * | 4/2003 | Ogaki et al. | 455/456 |
| 2003/0167405 A1 | 9/2003 | Freund et al. | |
| 2004/0113772 A1 * | 6/2004 | Hong Chou | 340/539.13 |
| 2004/0121783 A1 * | 6/2004 | Chua et al. | 455/456.1 |
| 2004/0152471 A1 * | 8/2004 | MacDonald et al. | 455/456.1 |
| 2005/0025182 A1 | 2/2005 | Nazari | |
| 2006/0217130 A1 * | 9/2006 | Rowitch et al. | 455/456.1 |
| 2006/0238419 A1 * | 10/2006 | Bucknor et al. | 342/357.09 |

OTHER PUBLICATIONS

International Search Report and Written Opinion for International Application PCT/US07/08511, mail date May 21, 2008, 11 pages.

* cited by examiner

*Primary Examiner* — Kent Chang
*Assistant Examiner* — Chayce Bibbee
(74) *Attorney, Agent, or Firm* — Norton Rose Fulbright US LLP

(57) ABSTRACT

Various embodiments of systems and techniques for providing location-based services (LBS) to a mobile computing device having a dual processor architecture are described. In one or more embodiments, the mobile computing device may comprise or implement hardware and/or software configured to enable LBS and data communications sessions using a single active data stack at any particular point in time. Other embodiments are described and claimed.

19 Claims, 8 Drawing Sheets

APPARATUS AND METHODS FOR PROVIDING LOCATION-BASED SERVICES TO A MOBILE COMPUTING DEVICE HAVING A DUAL PROCESSOR ARCHITECTURE

BACKGROUND

A mobile computing device such as a combination handheld computer and mobile telephone or smart phone generally may provide voice and data communications functionality, as well as computing and processing capabilities. A mobile computing device also may provide position determination capabilities to allow a user to receive a variety of location-based services (LBS) according to the current position of the mobile computing device.

To provide additional processing power for complex applications, a mobile computing device may employ a dual processor architecture including a host processor and a radio processor. In order to accommodate the dual processor architecture, conventional implementations for applications such as LBS applications must be modified. Consequently, there may be a need for an apparatus and methods for providing LBS to a mobile computing device having a dual processor architecture.

DETAILED DESCRIPTION

Various embodiments are directed to systems and techniques for providing location-based services (LBS) to a mobile computing device having a dual processor architecture. In one or more embodiments, the mobile computing device may comprise or implement hardware and/or software configured to enable LBS and data communications sessions using a single active data stack at any particular point in time.

Figure 1:
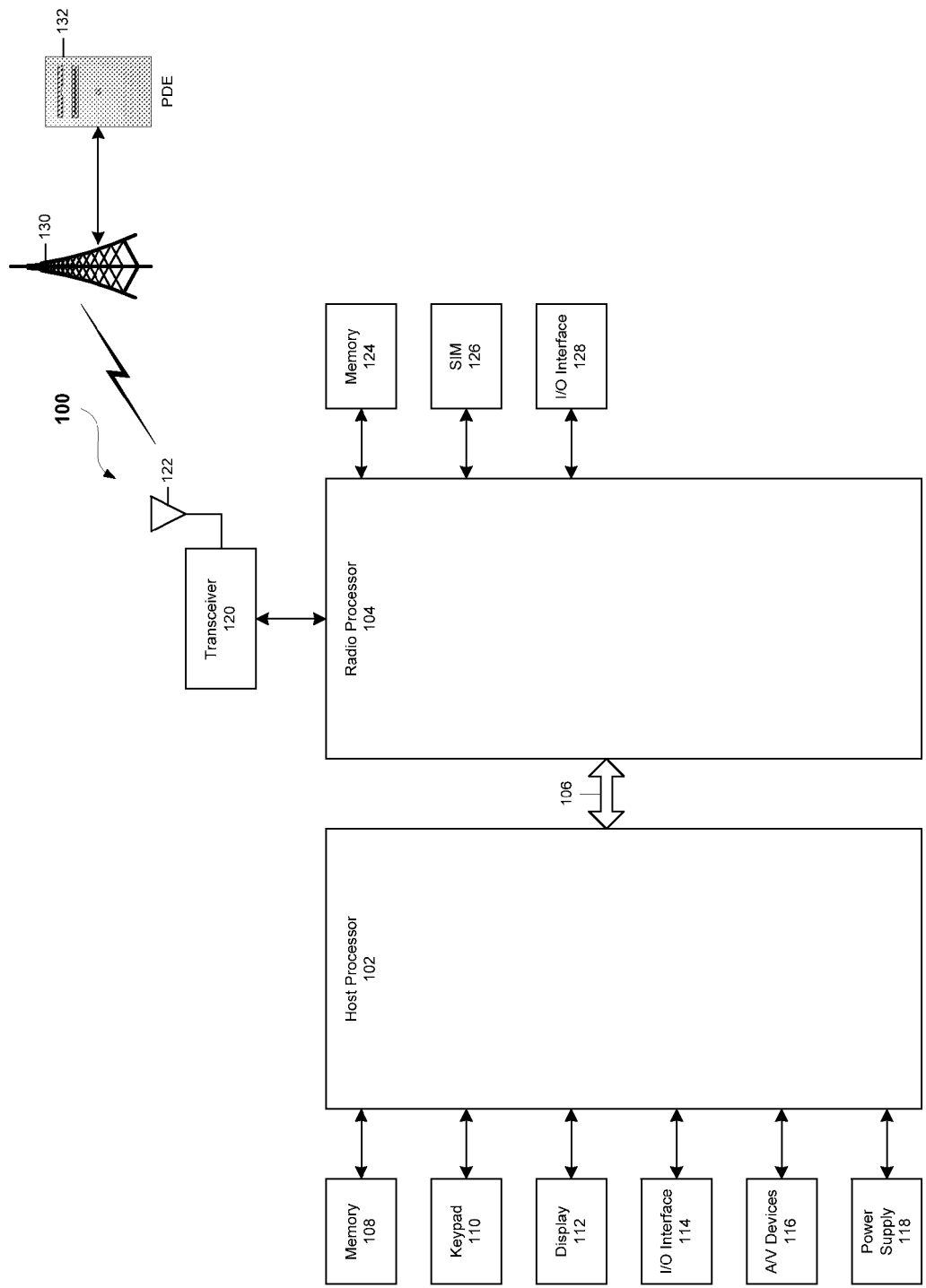
FIG. 1 illustrates a mobile computing device having a dual processor architecture for use within an exemplary network in accordance with one or more embodiments.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1 xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual processor architecture including a host processor 102 and a radio processor 104. The host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for the mobile computing device 100. The radio processor 104 may be responsible for performing various voice and data communications operations for the mobile computing device 100 such as transmitting and receiving voice and data information over one or more wireless communications channels. Although embodiments of the dual processor architecture may be described as comprising the host processor 102 and the radio processor 104 for purposes of illustration, it is worthy to note that the dual processor architecture of the mobile computing device 100 may comprise additional processors.

In various embodiments, the host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

The host processor 102 may be arranged to provide processing or computing resources to the mobile computing device 100. For example, the host processor 102 may be responsible for executing various software programs such as application programs and system programs to provide computing and processing operations for the mobile computing device 100. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between the mobile computing device 100 and a user.

System programs assists in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Runtime Environment for Wireless (BREW) OS, JavaOS, a Wireless Application Protocol (WAP) OS, and so forth.

The mobile computing device 100 may comprise a memory 108 coupled to the host processor 102. In various embodiments, the memory 108 may be arranged to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

Although the memory 108 may be shown as being separate from the host processor 102 for purposes of illustration, it is worthy to note that in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The mobile computing device 100 may comprise an alphanumeric keypad 110 coupled to the host processor 102. The keypad 110 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The host processor 102 may be coupled to a display 112. The display 112 may comprise any suitable visual interface for displaying content to a user of the mobile computing device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 116 that support A/V capability of the mobile computing device 100. Examples of A/V devices 114 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 arranged to supply and manage power to the elements of the mobile computing device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a transceiver module 120 coupled to the radio processor 104. The transceiver module 120 may comprise one or more transceivers arranged to communicate using different types of protocols, communication ranges, operating power requirements, RF sub-bands, information types (e.g., voice or data), use scenarios, applications, and so forth. In various embodiments, the transceiver module 120 may comprise one or more transceivers arranged to support voice communication for a cellular radiotelephone system such as a GSM, UMTS, and/or CDMA system. The transceiver module 120 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, it is worthy to note that in various embodiments some portion or the entire transceiver module 120 may be included on the same integrated circuit as the radio processor 104. The embodiments are not limited in this context.

The mobile computing device 100 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

The mobile computing device 100 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, and so forth. The memory 124 may comprise, for example, flash memory and secure digital (SD) RAM. Although the memory 124 may be shown as being separate from and external to the radio processor 104 for purposes of illustration, it is worthy to note that in various embodiments some portion or the entire memory 124 may be included on the same integrated circuit as the radio processor 104.

The mobile computing device 100 may comprise a subscriber identity module (SIM) 126 coupled to the radio processor 104. The SIM 126 may comprise, for example, a removable or non-removable smart card arranged to encrypt voice and data transmissions and to store user-specific data for allowing a voice or data communications network to identify and authenticate the user. The SIM 126 also may store data such as personal settings specific to the user.

The mobile computing device 100 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between the mobile computing device 100 and one or more external computer systems.

In various embodiments, the mobile computing device 100 may comprise position determination capabilities. The mobile computing device 100 may employ one or more position determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

The mobile computing device 100 may be arranged to operate in one or more position determination modes including, for example, a standalone mode, a mobile station (MS)

assisted mode, and/or a MS-based mode. In a standalone mode, such as a standalone GPS mode, the mobile computing device 100 may be arranged to autonomously determine its position without network interaction or support. When operating in an MS-assisted mode or an MS-based mode, however, the mobile computing device 100 may be arranged communicate over a radio access network 130 (e.g., UMTS radio access network) with a position determination entity (PDE) 132 such as a location proxy server (LPS) and/or a mobile positioning center (MPC).

In an MS-assisted mode, such as an MS-assisted AGPS mode, the PDE 132 may be arranged to determine the position of the mobile computing device. In an MS-based mode, such as an MS-based AGPS mode, the mobile computing device 100 may be arranged to determine its position with only limited periodic assistance from the PDE 132. In various implementations, the mobile computing device 100 and the PDE 132 may be arranged to communicate according a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting the mobile computer device 100, the PDE 132 may handle various processing operations and also may provide information to aid position determination. Examples of assisting information may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth.

In various implementations, the assisting information provided by the PDE 132 may improve the speed of satellite acquisition and the probability of a position fix by concentrating the search for a GPS signal and/or may improve the accuracy of position determination. Each position fix or series of position fixes may be available at the mobile computing device 100 and/or at the PDE 132 depending on the position determination mode. In some cases, data calls may be made and assisting information may be sent to the mobile computing device 100 from the PDE 132 for every position fix. In other cases, data calls may be made and assistance information may be sent periodically and/or as needed.

In various embodiments, the mobile computing device 100 may comprise dedicated hardware circuits or structures, or a combination of dedicated hardware and associated software, to support position determination. For example, the transceiver module 120 and the antenna system 122 may comprise GPS receiver or transceiver hardware and one or more associated antennas coupled to the radio processor 104 to support position determination.

Figure 2:
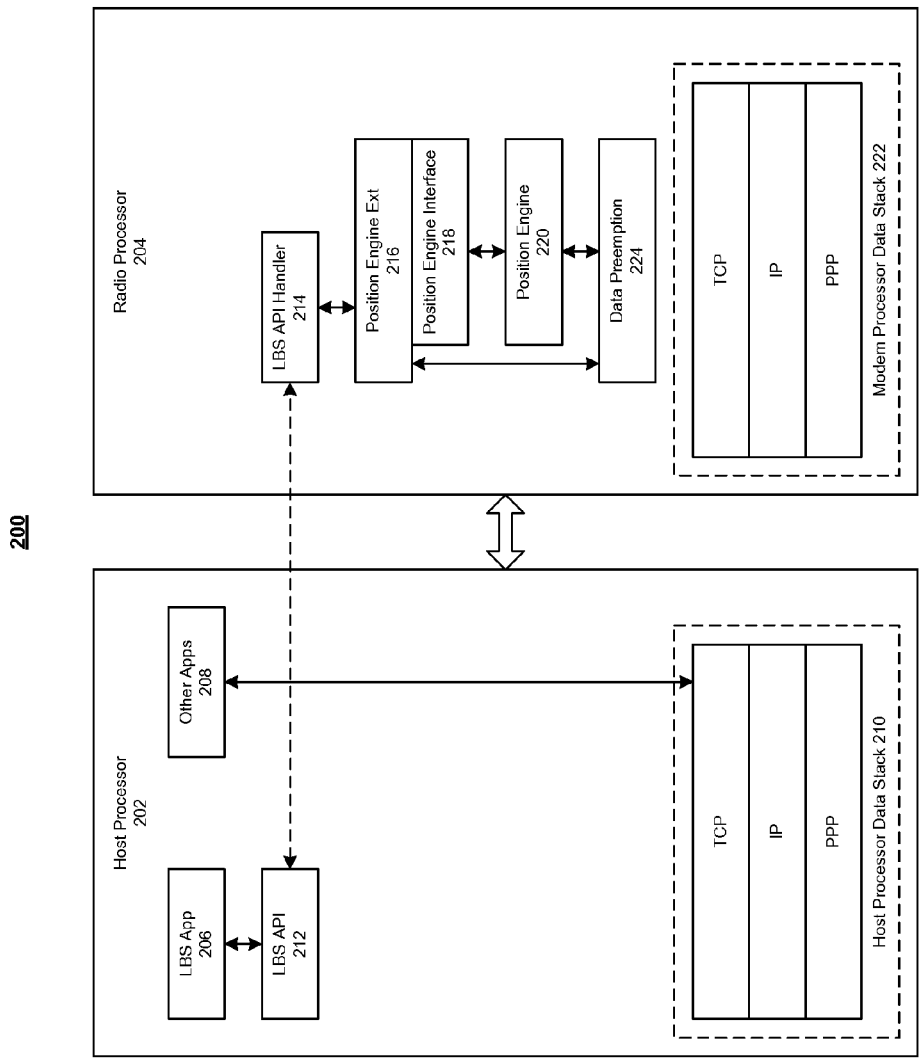
FIG. 2 illustrates a mobile computing device in accordance with one or more embodiments.

FIG. 2 illustrates a mobile computing device 200 in accordance with one or more embodiments. Although various elements and functions of the mobile computing device 200 may not be described in detail, it is to be understood that the mobile computing device 200 may implement any element or function described herein which is consistent with the described embodiments.

The mobile computing device 200 may comprise a dual processor architecture including a host processor 202 and a radio processor 204. The host processor 202 and the radio processor 204 may enable the mobile computing device 200 to provide position determination capabilities to allow a user to receive a variety of location-based services (LBS) according to the current position of the mobile computing device 200.

The host processor 202 may comprise and/or implement at least one LBS application 206. In general, the LBS application 206 may comprise any type of client application executed by the host processor 202, such as a GPS application, arranged to communicate location requests and location responses. Examples of LBS include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application 206 may be arranged to send a location request in response to receiving input from the mobile computing device 200 or from a source external to the mobile computing device 200. For example, the user of the mobile computing device 200 may interact with a data input device to command the LBS application 206 to send a location request. The LBS application 206 also may send a location request in response to receiving input from an external network element or computing device that is attempting to locate the user of the mobile computing device 200. In some cases, the LBS application 206 also may be arranged to automatically, periodically, and/or autonomously send location requests.

As shown in FIG. 2, the host processor 202 also may comprise and/or implement one or more other applications 208 in addition to the LBS application 206. In general, the other applications 208 may comprise any type of client application executed by the host processor 202 that operates without regard to the location of the mobile computing device 200. The other applications 208 may comprise, for example, one or more messaging applications (e.g., telephone, voicemail, e-mail, IM, SMS, MMS), a web browser application, personal management applications (e.g., PIM, contacts, calendar, scheduling, tasks), word processing applications, spreadsheet applications, database applications, media applications (e.g., video player, audio player, multimedia player, digital camera, video camera, media management), gaming applications, and so forth.

Although the other applications 208 may operate without regard to the location of the mobile computing device 200, it can be appreciated that in various embodiments, the LBS application 206 may request and receive position information to enhance the functionality of one or more of the other applications 208. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place. The embodiments are not limited in this context.

The host processor 202 may comprise or implement a data stack 210 including a set of lower layers including, for example, a transport layer such as a Transmission Control Protocol (TCP) layer, a network layer such as an Internet Protocol (IP) layer, and a link layer such as a Point-to-Point (PPP) layer. Together with the application layer, the data stack 210 may comprise a software implementation of a computer networking protocol suite defining various protocols (e.g., TCP/IP/PPP protocols) that support data communications. In various embodiments, upper layer programs may communicate using the data stack 210 through a data socket interface such as a Microsoft® Windows® Sockets (Winsock) interface that enables upper layer programs to access network services using the data stack 210.

The host processor 202 may comprise or implement an LBS API 212, such as a GPS API, coupled to the LBS application 206. In various embodiments, the LBS API 212 may be arranged to allow communication of location requests and location responses between the LBS application 206 and one or more position determination programs implemented on the radio processor 204. In such embodiments, the LBS API 212 may comprise a remote API with respect to the radio processor 204 which allows the LBS application 206 running on the data stack 210 of the host processor 202 to access one or more position determination programs running on the radio processor 204.

The LBS API 212 may comprise an interface to an LBS API handler 214 (e.g., GPS API handler) implemented on the radio processor 204. The LBS API handler 214 may be arranged to provide connectivity between the LBS API 212 and one or more position determination programs implemented on the radio processor 204 such as a position engine extension 216, a position engine interface 218 and a position engine 220 for allowing the exchange of location requests and location responses. In various implementations, the LBS API handler 214 may be configured to forward location requests received from the LBS application 206 through the LBS API 212 to one or more of the position engine extension 216, the position engine interface 218, and the position engine 220.

The radio processor 204 may comprise or implement a position engine extension 216 such as a PDE (e.g., LPS and/or MPC) extension. In one embodiment, for example, the position engine extension 216 may be implemented as one or more BREW-based LPS extensions such as QUALCOMM® ILpsPosDet and/or IGeoservice interfaces. The position engine extension 216 may be arranged to receive location requests from the LBS API handler 214 and may forward location responses to the LBS API handler 214 for delivery to the LBS application 206 through the LBS API 212.

The position engine extension 216 may be arranged to provide client registration and provisioning of privacy settings. The position engine extension 216 also may be arranged to communicate securely over a network with a PDE (e.g., LPS or MPC) arranged to provide authentication and authorization services and/or a variety of geo-services. For example, the position engine extension 216 may be arranged to communicate with a PDE configured to verify privacy for location requests, allow authorized access to a location server, and provide various location server services. The position engine extension 216 also may be arranged to communicate with a PDE to request and receive geo-service information. Examples of geo-service information may include mapping information, routing information, geo-coding and reverse geo-coding information for addresses and coordinates, POI information, and so forth.

The radio processor 204 may comprise or implement a position engine interface 218 such as position engine API and/or one or more position engine libraries. The position engine interface 218 may comprise any suitable API and/or libraries used to generate one or more position fixes using the position engine 220. In one embodiment, for example, the position engine interface 218 may be implemented as a BREW-based API such as a QUALCOMM® IPosDet API.

The position engine interface 218 may be arranged to invoke a position fix by configuring the position engine 220 and requesting a position fix. For example, the position engine interface 218 may set configuration parameters that control the position determination process. Examples of configuration parameters may include, without limitation, position determination mode (e.g., standalone, MS-assisted, MS-based), actual or estimated number of position fixes (e.g., single position fix, series of position fixes, request assisting information without a position fix), time interval between position fixes, Quality of Service (QoS) values, optimization parameters (e.g., optimized for speed, accuracy, or payload), PDE address (e.g., IP address and port number of LPS or MPC), and so forth.

The position engine interface 218 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

The radio processor 204 may comprise or implement a position engine 220 such as GPS engine. In various embodiments, the position engine 220 may be arranged to provide position determination capabilities for the mobile computing device 200. In some embodiments, the position engine 220 may be implemented as software operating in conjunction with hardware (e.g., GPS receiver hardware) allowing the mobile computing device 200 to receive and process GPS satellites signals for position determination. In one embodiment, the position engine 220 may be implemented as a QUALCOMM® gpsOne® engine.

In various implementations, the position engine 220 may employ one or more position determination techniques such as GPS, CGI, CGI+TA, EFLT, TDOA, AOA, AFTL, OTDOA, EOTD, AGPS, GPS/AGPS, hybrid techniques, and so forth. The position engine 220 also may be arranged to operate in one or more position determination modes including a standalone mode, an MS-assisted mode, and an MS-based mode. The determined position information generated and/or obtained by the position engine 220 generally may comprise any type of information associated with the location of the mobile computing device 200. Examples of position information may include, without limitation, current location, latitude, longitude, altitude, heading information, vector information such as horizontal and vertical velocity, sector-based position location, position fix information, position uncertainty, device orientation, and so forth.

In some implementations, determined position information may be cached for a certain period of time for subsequent and/or repeated use by the mobile computing device 200. The cached position information may be stored internally or externally to the host processor 202 and/or the radio processor 204 on one or more types of computer-readable storage media. In such implementations, a check may be made whether previously determined cached position information is valid prior to performing additional position determination processing. If the previously determined cached position information is still valid for the mobile computing device 200, the cached position information may be used by the position engine 220 avoiding the need for additional position determination processing. If the previously determined cached position information is not valid for the mobile computing device 200, the position engine 220 may generate or obtain position information by performing one or more position determination techniques in one or more position determination modes.

As shown in FIG. 2, the radio processor 204 may comprise or implement a data stack 222 including a set of lower layers including a transport layer (e.g., TCP layer), a network layer (e.g., IP layer), and a link layer (e.g., PPP layer). In various embodiments, upper layer programs such as one or more position determination programs may communicate using the data stack 222 through a data socket interface such as a Microsoft® Winsock interface that enables upper layer programs to access network services using the data stack 222.

Although some embodiments may be described with the data stack 210 and the data stack 222 implemented as a TCP/IP/PPP protocol data stacks by way of example, it may be appreciated that the data stack 210 and/or the data stack 222 may comprise or implement other suitable types of transport layers, network layers, and/or link layers in accordance with the described embodiments.

In various embodiments, the host processor 202 may comprise or implement a data stack 210, and the radio processor 204 may comprise or implement a data stack 222. In such embodiments, the dual processor architecture may be limited such that only one of the data stack 210 of the host processor 202 and the data stack 222 of the radio processor 204 may be active at a particular point in time. Accordingly, systems and techniques are needed for providing LBS to a mobile computing device 200 having a dual processor architecture in which the data stack 210 of the host processor 202 and the data stack 222 of the radio processor 204 are not capable of simultaneous operation.

The data stack 222 of the radio processor 204 may be arranged to serve and/or support one or more LBS communications sessions such as a GPS communications session (e.g., IS-801 message session) for the LBS application 206 (e.g., GPS application), while the data stack 210 of the host processor 202 may be arranged to serve and/or support communication sessions for the other applications 208 such as messaging applications, a web browser application, and/or any other client applications in accordance with the described embodiments. The LBS API 212 (e.g., GPS API) implemented by the host processor 202 may be configured to interface with the LBS API handler 214 (e.g., GPS API handler) on the radio processor 204 to enable access to various position determination programs which are served by and/or communicate using the data stack 222.

The position engine extension 216 and/or the position engine 220 may be arranged to communicate with a PDE (e.g., LPS or MPC) using the data stack 222 of the radio processor 204. The position engine extension 216 and/or the position engine 220 may communicate with the PDE according a suitable MS-PDE protocol (e.g., MS-LPS or MS-MPC protocol) such as the TIA/EIA standard IS-801 message protocol for MS-assisted and MS-based sessions in a CDMA radiotelephone system. For example, the position engine 220 may operate in an MS-assisted or MS-based mode to generate or obtain position information for the mobile computing device 200 by initiating a message session (e.g., IS-801 message session) with the PDE using the data stack 222, communicating a position information download/assist request to the PDE, and receiving a position information download/assist response from the PDE. The embodiments are not limited in its context.

In some implementations, the position engine extension 216 may enable the mobile computing device 200 to obtain network assistance from a PDE for authenticating the mobile computing device 200 and/or the LBS application 206 by initiating a message session (e.g., IS-801 message session) with the PDE using the data stack 222, communicating an authentication download/assist request to the PDE, and receiving an authentication download/assist response from the PDE. In some implementations, the position engine extension 216 may enable the mobile computing device 200 to obtain network assistance from a PDE for receiving geo-service information by initiating a message session (e.g., IS-801 message session) with the PDE using the data stack 222, communicating a geo-service download/assist request to the PDE, and receiving a geo-service download/assist response from the PDE.

In this embodiment, the other applications 208 may comprise, for example, a messaging application, web browser application, or other client application executed by the host processor 202 that operates without regard to the location of the mobile computing device 200. The other applications 208 may be arranged to initiate and perform one or more communications sessions such as a data communications session using the data stack 210. In various implementations, the other applications 208 may perform data communications sessions using the data stack 210 in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

As shown in FIG. 2, the radio processor 204 may comprise or implement a data preemption module 224 on top of the data stack 222 that is coupled to the position engine extension 216 and/or the position engine 220. The data preemption module 224 may enable LBS and data communications sessions using a single active data stack at any particular point in time. In one embodiment, for example, the data preemption module 224 may be arranged to detect the invocation and/or initiation of an LBS communications session using the data stack 222 and to preempt the data stack 210 and/or any existing data communications sessions on the host processor 202.

In various implementations, the LBS communications session may comprise a GPS communications session (e.g., IS-801 message session) invoked and/or initiated by the position engine extension 216 and/or the position engine 220 in response to a location request from the LBS application 206. For example, the LBS API handler 214 may receive a location request received from the LBS application 206 through the LBS API 212 and then may forward the location request to one or more of the position engine extension 216, the position engine interface 218, and/or the position engine 220.

In response to detecting the invocation and/or initiation of an LBS communications session, the data preemption module 224 may be arranged to preempt the data stack 210 and/or any existing communications sessions on the host processor 202. For example, the data preemption module 224 may instruct the host processor 202 to terminate all current data communications sessions established using the data stack 210. The data preemption module 224 also may instruct the host processor 202 to prevent any new data communications sessions from being established using the data stack 210 until the LBS communications session established using the data stack 222 concludes and/or is terminated. Accordingly, after an LBS communications session (e.g., GPS communications session) is invoked and/or initiated and until an established LBS session is terminated, the data stack 210 is and remains preempted. As such, for the duration of the LBS communication session, the host processor 202 and the radio processor 204 are configured to use only the active data stack 222 on the radio processor 204. The embodiments, however, are not limited in this context.

In various embodiments, the information and/or network assistance received from a PDE during an LBS session may enable the position engine extension 216 and/or the position engine 220 to generate a location response that fulfills a location request from the LBS application 206. The position engine extension 216 and/or the position engine 220 may communicate the location response to the LBS API handler 214 which, in turn, may forward the location response to the LBS application 206 through the LBS API 212.

It can be appreciated that when preemption of the data stack 210 occurs, data communications sessions for one or more of the other applications 208 running on the host processor 202 may be lost. In addition, new data communications sessions for the other applications 208 will be prevented from opening until the LBS communications session established using the data stack 222 concludes or terminates. As such, preempting the data stack 210 whenever an LBS communications session is invoked and/or initiated using the data stack 222 sometimes may result in unpredictable and unexpected experiences for the user of the mobile computing device 200.

Figure 3:
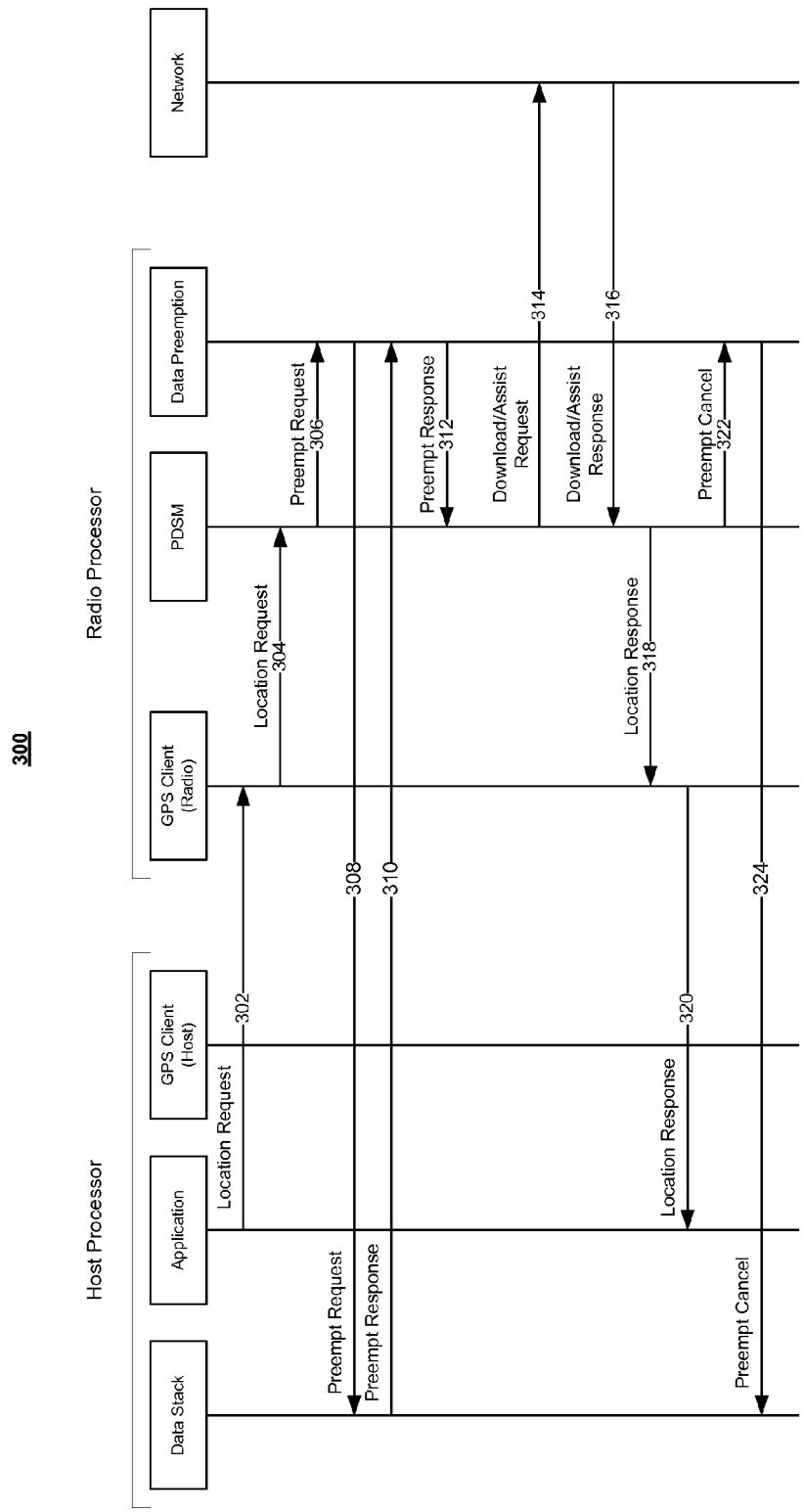
FIG. 3 illustrates a flow diagram in accordance with the mobile computing device of FIG. 2.

FIG. 3 illustrates one embodiment of a flow diagram 300 for enabling LBS and data communications sessions using a single active data stack at any particular point of time. The flow diagram 300 may be performed in accordance with the mobile computing device 200 of FIG. 2. The embodiments, however, are not limited in this context.

As shown in FIG. 3, an application (e.g., LBS application 206) invokes and communicates a location request 302 through a host GPS client (e.g., LBS API 212) implemented by a host processor (e.g., host processor 202) to a radio GPS client (e.g., LBS API handler 214) implemented by a radio processor (e.g., radio processor 204).

The radio GPS client forwards the location request 304 to a position determination service module (PDSM) implemented on the radio processor. The PDSM may comprise, for example, one or more of a position engine extension (e.g., position engine extension 216), a position engine interface (e.g., position engine interface 218), and a position engine (e.g., position engine 220). The PDSM may be arranged to generate or obtain position information by performing one or more position determination techniques in one or more position determination modes.

As shown in FIG. 3, the PDSM communicates a preemption request 306 to a data preemption module (e.g., data preemption module 224) implemented on the radio processor. In some implementations, the PDSM may communicate the preemption request in response to detecting the invocation and/or initiation of an LBS communications session.

The data preemption module sends a preempt request 308 to a data stack (e.g., data stack 210) implemented on the host processor and receives a preempt response 310 indicating that the data stack and/or any existing communications sessions on the host processor have been preempted. In some implementations, all current data communications sessions established using the data stack on the host processor are preempted and new data communications sessions are prevented from being established using the data stack until the LBS communications session concludes and/or is terminated.

The data preemption module sends a preempt response 312 to the PDSM indicating that the data stack has been preempted and an LBS communications session may be established. The PDSM communicates a download/assist request 314 such as an authentication download/assist request, a geo-services download/assist request, and/or a position information download/assist request to a network entity such as PDE (e.g., LPS or MPC) configured to provide network assistance for authentication, authorization, geo-services, and/or position determination. The PDSM then receives a download/assist response 316 from the network entity. In various embodiments, the PDSM may communicate with the network entity using a data stack (e.g., data stack 222) implemented on the radio processor.

The PDSM communicates a location response 318 to the radio GPS client. In response, the radio GPS client communicates the location response 320 to the host GPS client which, in turn, forwards the location response to the application. The PDSM subsequently may instruct the data preemption module 322 to cancel the data preemption on the host data stack 324. In various embodiments, the PDSM may be arranged to post-process the download/assist response data to determine a location response which fulfills the location request from the application. In an MS-based mode, the PDSM may be arranged to determine a location response with only limited periodic assistance from the network entity. In an MS-assisted mode, the network entity may determine and provide a location response to the PDSM through the exchange of assisting information.

Subsequently, the PDSM may communicate a preempt cancel instruction 322 to the data preemption module. In response, the data preemption module may send a preempt cancel instruction 324 to the host data stack for to canceling the data preemption.

Figure 4:
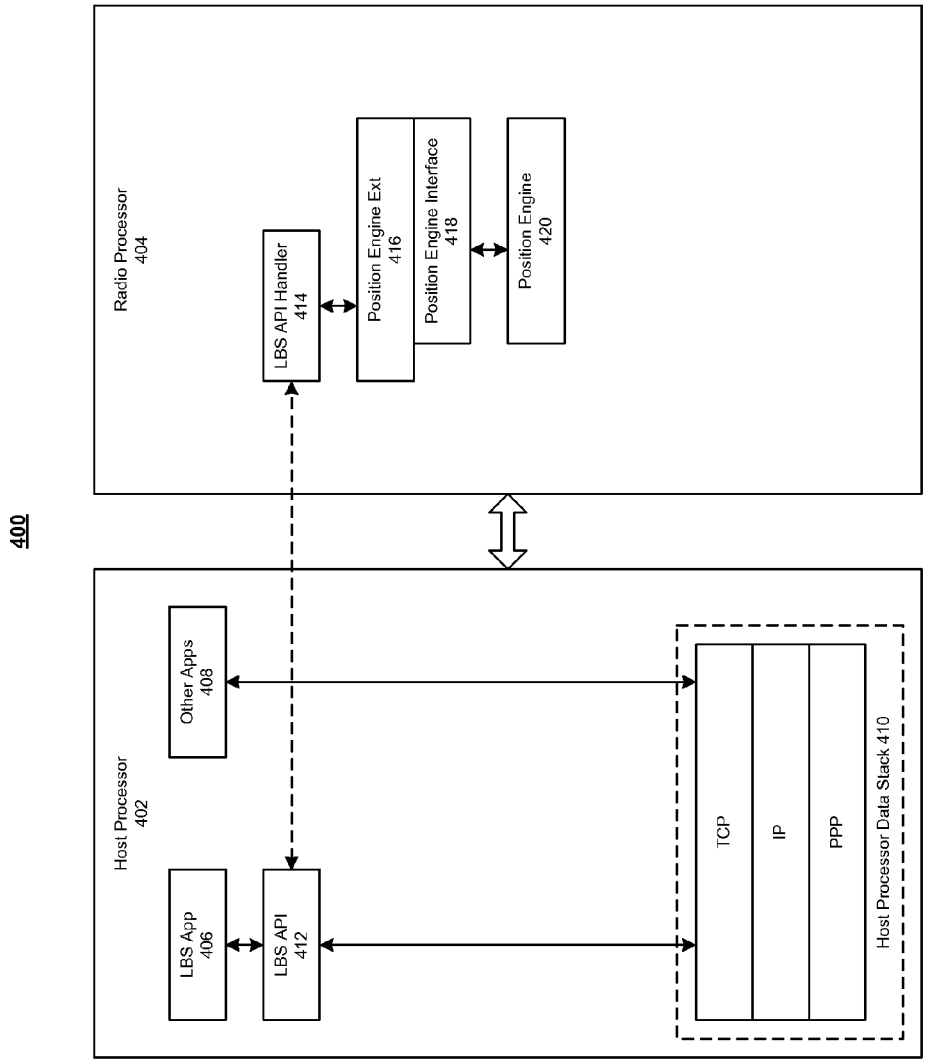
FIG. 4 illustrates a mobile computing device in accordance with one or more embodiments.

FIG. 4 illustrates a mobile computing device 400 in accordance with one or more embodiments. Although various elements and functions of the mobile computing device 400 may not be described in detail, it is to be understood that the mobile computing device 400 may implement any element or function described herein which is consistent with the described embodiments.

The mobile computing device 400 may comprise a dual processor architecture including a host processor 402 and a radio processor 404. The host processor 402 and the radio processor 404 may enable the mobile computing device 400 to provide position determination capabilities to allow a user to receive a variety of location-based services (LBS) according to the current position of the mobile computing device 400. The host processor 402 may comprise and/or implement at least one LBS application 406 and one or more other applications 408 on top of a data stack 410 including, for example, a TCP layer, an IP layer, and a PPP layer.

In this embodiment, the other applications 408 (e.g., messaging application, web browser application, and/or other client application) executed by the host processor 402 may be arranged to initiate and perform one or more communications sessions such as a data communications session using the data stack 410. In various implementations, the other applications 408 may perform data communications sessions using the data stack 410 in accordance with one or more wireless communications protocols.

In this embodiment, LBS and data communications sessions may be established using the data stack 410 of the host processor 402. In such an embodiment, the LBS communications sessions may comprise remote LBS communications sessions with respect to the radio processor 404. In this embodiment, a data stack implemented by the radio processor 404 is not used for LBS or data communications sessions and may be omitted, removed, deactivated, and/or circumvented in the context of performing LBS or data communications sessions.

The host processor 402 may comprise an LBS API 412 (e.g., GPS API) arranged to allow communication of location requests and location responses between the LBS application 406 and one or more position determination programs implemented on the radio processor 404. The LBS API 412 may comprise an interface to an LBS API handler 414 (e.g., GPS API handler) implemented on the radio processor 404. The LBS API handler 414 may be arranged to provide connectivity between the LBS API 412 and one or more position determination programs implemented on the radio processor 404 such as a position engine extension 416, a position engine interface 418 and a position engine 420 for allowing the exchange of location requests and location responses. In various implementations, the LBS API handler 414 may be configured to forward location requests received from the LBS application 406 through the LBS API 412 to one or more of the position engine extension 416, the position engine interface 418, and the position engine 420.

The position engine extension 416 may comprise a PDE (e.g., LPS and/or MPC) extension arranged to receive location requests from the LBS API handler 414 and to communicate with a PDE (e.g., LPS and/or MPC). In various embodiments, the position engine extension 416 may be arranged to communicate with the PDE according to a suitable MS-PDE protocol (e.g., MS-LPS or MS-MPC protocol) for authenticating and authorizing the mobile computing device 400 to receive network-assisted position determination and/or for requesting and receiving geo-service information.

The position engine interface 418 may comprise a position engine API and/or one or more position engine libraries used to generate one or more position fixes using the position engine 420. In various embodiments, the position engine interface 418 may be arranged to invoke a position fix by configuring the position engine 420 and requesting a position fix.

The position engine 420 may comprise a GPS engine arranged to provide position determination capabilities for the mobile computing device 400. In various embodiments, the position engine 420 may employ one or more position determination techniques such as GPS, CGI, CGI+TA, EFLT, TDOA, AOA, AFTL, OTDOA, EOTD, AGPS, GPS/AGPS, hybrid techniques, and so forth. The position engine 420 may be arranged to operate in one or more position determination modes including a standalone mode, an MS-assisted mode, and an MS-based mode.

In various embodiments, the position engine 420 may be arranged to employ one or more position determination techniques and to operate in a standalone mode. In a standalone mode (e.g., standalone GPS mode), the position engine 420 may be arranged to autonomously determine position information for the mobile computing device 400 without network support. In various implementations, the position information obtained in the standalone mode (e.g., standalone GPS mode) may enable the position engine extension 416 and/or the position engine 420 to generate a location response that fulfills a location request from the LBS application 406. The position engine extension 416 and/or the position engine 420 may communicate the location response to the LBS API handler 414 which, in turn, may forward the location response to the LBS application 406 through the LBS API 412.

In standalone mode, obtaining the first position fix from the position engine 420 may take a long time (e.g., several minutes) for a cold start. In addition, when operating in a standalone mode, the position engine may have indoor issues due to the need to demodulate the ephemeris data. In various implementations, the LBS application 406 may be arranged to provide data to the position engine for hiding the first position fix to lessen the time required to perform position determination.

In various embodiments, the position engine extension 416 and/or the position engine 420 may be arranged to download and/or request network assistance from a PDE (e.g., LPS or MPC) in response to a location request from the LBS application 406. In some implementations, the position engine extension 416 may download and/or request network assistance from a PDE for authenticating the mobile computing device 400 and/or the LBS application 406. In some implementations, the position engine extension 416 may download and/or request network assistance from a PDE for receiving one or more geo-services. In some implementations, the position engine 420 may download and/or request network assistance from a PDE for generating and/or obtaining position information for the mobile computing device 400.

In this embodiment, the LBS API handler 414 may be arranged to receive one or more download/assist requests from the position engine extension 416 and/or the position engine 420. In some implementations, the position engine extension 416 may communicate a download/assist request such as an authentication download/assist or a geo-service download/assist request to the LBS API handler 414. In some implementations, such as when position information is not locally available or when not operating in a standalone mode, the position engine 420 may communicate a download/assist request such as a position information download/assist request to the LBS API handler 414.

In response to receiving the one or more download/assist requests, the LBS API handler 414 may be arranged to route one or more request/response messages to the LBS API 412 on the host processor 402. In various embodiments, the LBS API 412 on the host processor 402 may comprise an interface to a network entity, such as a PDE, for communicating request/response messages using the data stack 410 on the host processor 402. The PDE may comprise, for example, a location server such as an LPS or MPC configured to provide network-assistance to the mobile computing device 400 for authentication, authorization, geo-services, and/or position determination. In various embodiments, the position engine extension 416 may comprise a PDE interface (e.g., LPS interface or MPC interface) for establishing an LBS communications session such as a GPS communications session (e.g., IS-801 message session) with the PDE using the data stack 410 through the LBS API 412 and the LBS API handler 414.

In various implementations, the request/response messages communicated to and from the PDE using the data stack 410 may comprise raw request/response data or parameters for requesting and receiving network assistance. In some implementations, the request/response messages sent to the PDE using the data stack 410 may comprise, for example, authentication data or parameters (e.g., MS identification, LBS application identification, user identification, privacy settings, etc.) for requesting and receiving authentication and authorization for network-assisted position determination. In some implementations, the request/response message sent to the PDE using the data stack 410 may comprise, for example, geo-service data or parameters (e.g., mapping, routing, geo-coding, reverse geo-coding, POI, etc.) for requesting and receiving network-assisted geo-services. In some implementations, the request/response message sent to the PDE using the data stack 410 may comprise, for example, position data or parameters (e.g., current location, latitude, longitude, altitude, heading, vector, horizontal velocity, vertical velocity, sector-based position location, position fix, accuracy level, time offset, position uncertainty, device orientation, client initialization and registration, etc.) for requesting and receiving network-assisted position determination.

In some implementations, the LBS API 412 may be arranged to relay communications between the position engine 420 and a PDE (e.g., LPS or MPC) using the data stack 410 of the host processor 402 according a suitable MS-PDE protocol (e.g., MS-LPS or MS-MPC protocol) such as the TIA/EIA standard IS-801 message protocol for MS-assisted and MS-based sessions in a CDMA system. In such implementations, the LBS API 412 may enable the mobile computing device 400 to initiate and establish an LBS message session (e.g., IS-801 message session) with the PDE using the data stack 410 and obtain network assistance from the PDE for authentication, authorization, geo-services, and/or position determination.

In various embodiments, the information and/or network assistance received during an LBS session with a PDE using the data stack 410 is routed to LBS API handler 414 on the radio processor 404 and is communicated within a download/assist response that fulfills a download/assist request from the position engine extension 416 and/or the position engine 420. The download/assist response may enable the position engine extension 416 and/or the position engine 420 to generate a location response that fulfills a location request from the LBS application 406. For example, the position engine extension 416 and/or the position engine 420 may be arranged to post-process the download/assist response to generate a location response which fulfills a location request received from the LBS application 406. The position engine extension 416 and/or the position engine 420 may communicate the location response to the LBS API handler 414 which, in turn, may forward the location response to the LBS application 406 through the LBS API 412.

Figure 5:
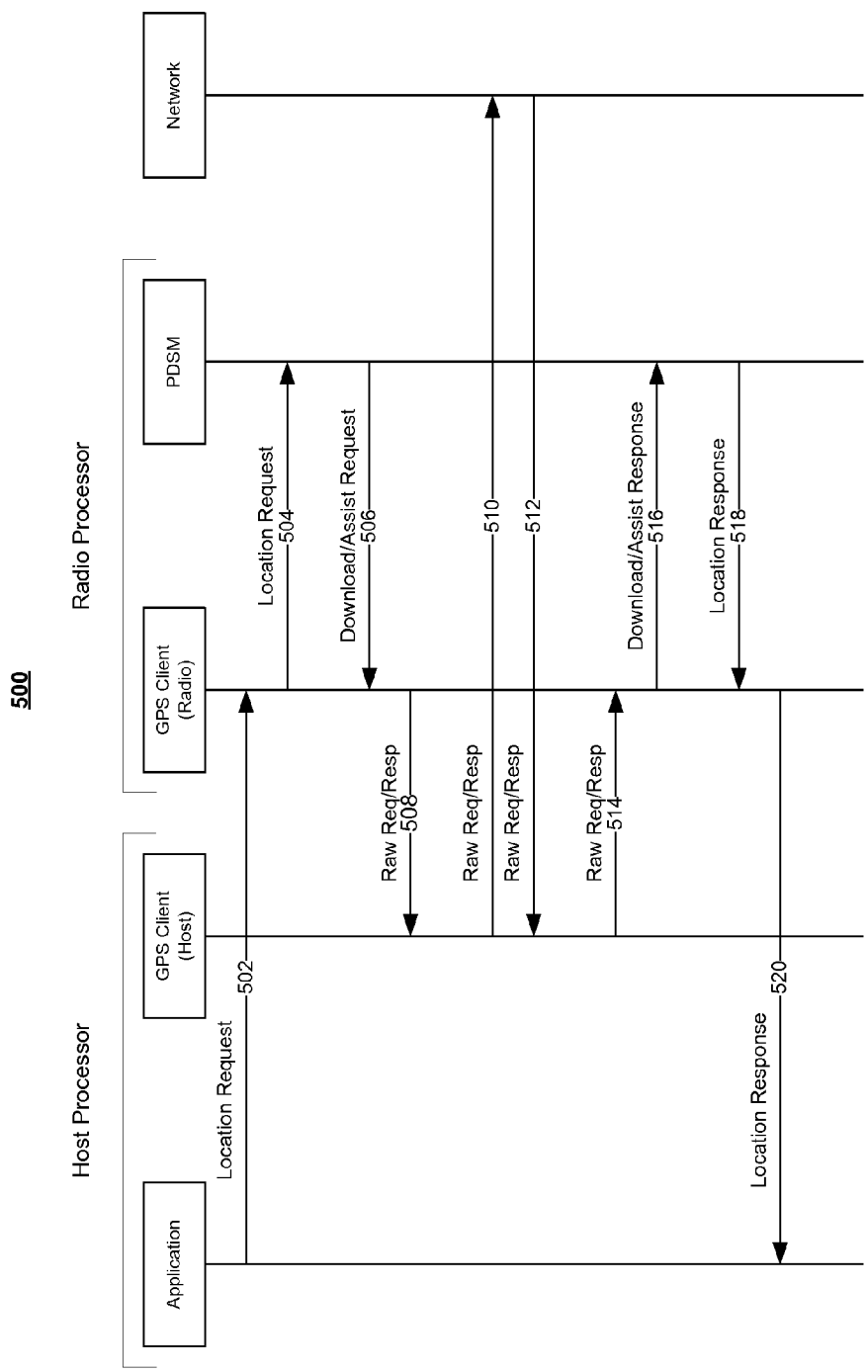
FIG. 5 illustrates a flow diagram in accordance with the mobile computing device of FIG. 4.

FIG. 5 illustrates one embodiment of a flow diagram 500 for enabling LBS and data communications sessions using a single active data stack at any particular point of time. The flow diagram 500 may be performed in accordance with the mobile computing device 400 of FIG. 4. The embodiments, however, are not limited in this context.

As shown in FIG. 5, an application (e.g., LBS application 406) invokes and communicates a location request 502 through a host GPS client (e.g., LBS API 412) implemented by a host processor (e.g., host processor 402) to a radio GPS client (e.g., LBS API handler 414) implemented by a radio processor (e.g., radio processor 404).

The radio GPS client forwards the location request 504 to a PDSM implemented on the radio processor. The PDSM may comprise, for example, one or more of a position engine extension (e.g., position engine extension 416), a position engine interface (e.g., position engine interface 418), and a position engine (e.g., position engine 420). The PDSM may be arranged to generate or obtain position information by performing one or more position determination techniques in one or more position determination modes.

As shown in FIG. 5, the PDSM communicates a download/assist request 506 such as an authentication download/assist request, a geo-services download/assist request, and/or a position information download/assist request to the radio GPS client. The radio GPS client, in response, sends raw request/response data or parameters 508 (e.g., authentication data or parameters, geo-service data or parameters, and/or position data or parameters) to the host GPS client. The host GPS client relays the raw request/response data or parameters 510 to a network entity such as PDE (e.g., LPS or MPC) configured to provide network assistance for authentication, authorization, geo-services, and/or position determination. In various embodiments, the host GPS client may relay the raw request/response data to the network entity through a data stack (e.g., data stack 410) implemented on the host processor.

The host GPS client receives raw request/response data 512 from the network entity. In various embodiments, the host GPS client may receive the raw request/response data from the network entity through a data stack implemented on the host processor. The host GPS client communicates some or all of the raw request/response data 514 received from the network entity to the radio GPS client. The radio GPS client communicates a download/assist response 516 to the PDSM. In various implementations, the download/assist response may include some or all of the raw request/response data received from the network entity.

The PDSM communicates a location response 518 to the radio GPS client. In response, the radio GPS client communicates the location response 520 to the host GPS client which, in turn, forwards the location response to the application. In various embodiments, the PDSM may be arranged to post-process the download/assist response data to determine a location response which fulfills the location request from the application. In an MS-based mode, the PDSM may be arranged to determine a location response with only limited periodic assistance from the network entity. In an MS-assisted mode, the network entity may determine and provide a location response to the PDSM through the exchange of assisting information.

Figure 6:
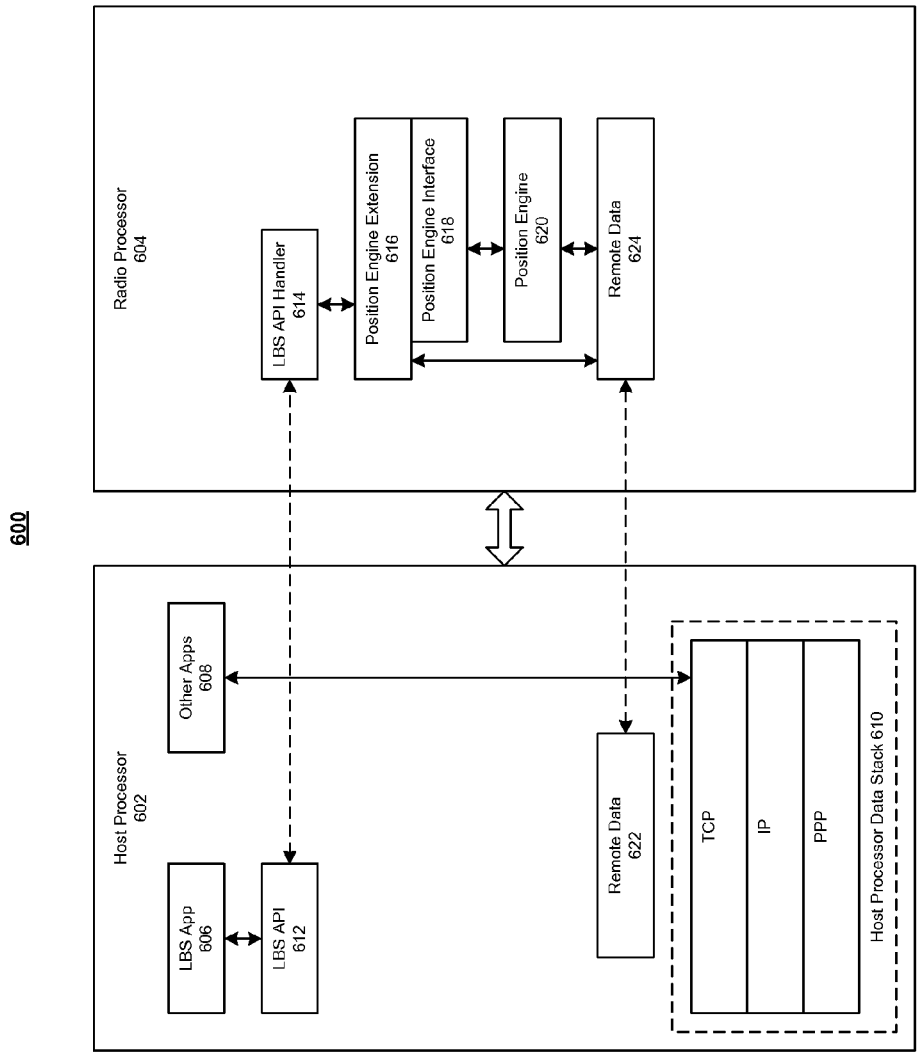
FIG. 6 illustrates a mobile computing device in accordance with one or more embodiments.

FIG. 6 illustrates a mobile computing device 600 in accordance with one or more embodiments. Although various elements and functions of the mobile computing device 600 may not be described in detail, it is to be understood that the mobile computing device 600 may implement any element or function described herein which is consistent with the described embodiments.

The mobile computing device 600 may comprise a dual processor architecture including a host processor 602 and a radio processor 604. The host processor 602 and the radio processor 604 may enable the mobile computing device 600 to provide position determination capabilities to allow a user to receive a variety of location-based services (LBS) according to the current position of the mobile computing device 600. The host processor 602 may comprise and/or implement at least one LBS application 606 and one or more other applications 608 on top of a data stack 610 including, for example, a TCP layer, an IP layer, and a PPP layer.

In this embodiment, the other applications 608 (e.g., messaging application, web browser application, and/or other client application) executed by the host processor 602 may be arranged to initiate and perform one or more communications sessions such as a data communications session using the data stack 610. In various implementations, the other applications 608 may perform data communications sessions using the data stack 610 in accordance with one or more wireless communications protocols.

In this embodiment, LBS and data communications sessions may be established using the data stack 610 of the host processor 602. In such an embodiment, the LBS communications sessions may comprise remote LBS communications sessions with respect to the radio processor 604. In this embodiment, a data stack implemented by the radio processor 604 is not used for LBS or data communications sessions and may be omitted, removed, deactivated, and/or circumvented in the context of performing LBS communications sessions.

The host processor 602 may comprise an LBS API 612 (e.g., GPS API) arranged to allow communication of location requests and location responses between the LBS application 606 and one or more position determination programs implemented on the radio processor 604. In various embodiments, the LBS API 612 may comprise an interface to an LBS API handler 614 (e.g., GPS API handler) implemented on the radio processor 604. The LBS API handler 614 may be arranged to provide connectivity between the LBS API 612 and one or more position determination programs implemented on the radio processor 604 such as a position engine extension 616, a position engine interface 618, and a position engine 620 for allowing the exchange of location requests and location responses. In various implementations, the LBS API handler 614 may be configured to forward location requests received from the LBS application 606 through the LBS API 612 to one or more of the position engine extension 616, the position engine interface 618, and the position engine 620.

The position engine extension 616 may comprise a PDE (e.g., LPS and/or MPC) extension arranged to receive location requests from the LBS API handler 614 and to communicate with a PDE (e.g., LPS and/or MPC). In various embodiments, the position engine extension 616 may be arranged to communicate with the PDE according to a suitable MS-PDE protocol (e.g., MS-LPS or MS-MPC protocol) for authenticating and authorizing the mobile computing device 600 to receive network-assisted position determination and/or for requesting and receiving geo-service information.

The position engine interface 618 may comprise a position engine API and/or one or more position engine libraries used to generate one or more position fixes using the position engine 620. In various embodiments, the position engine interface 618 may be arranged to invoke a position fix by configuring the position engine 620 and requesting a position fix.

The position engine 620 may comprise a GPS engine arranged to provide position determination capabilities for the mobile computing device 600. In various embodiments, the position engine 620 may employ one or more position determination techniques such as GPS, CGI, CGI+TA, EFLT, TDOA, AOA, AFTL, OTDOA, EOTD, AGPS, GPS/AGPS, hybrid techniques, and so forth. The position engine 620 may be arranged to operate in one or more position determination modes including a standalone mode, an MS-assisted mode, and an MS-based mode.

The position engine extension 616 and/or the position engine 620 may be arranged to download and/or request network assistance from a PDE (e.g., LPS or MPC) in response to a location request from the LBS application 606. In some implementations, the position engine extension 616 may download and/or request network assistance from a PDE for authenticating the mobile computing device 600 and/or the LBS application 606. In some implementations, the position engine extension 616 may download and/or request network assistance from a PDE for receiving one or more geo-services. In some implementations, the position engine 620 may download and/or request network assistance from a PDE for generating and/or obtaining position information for the mobile computing device 600.

As shown in FIG. 6, the host processor 602 may comprise or implement a remote data module 622. The radio processor 604 may comprise or implement a remote data module 624 that is coupled to the remote data module 622 as well as the position engine extension 616 and/or the position engine 620.

The remote data module 622 on the host processor 602 and the remote data module 624 on the radio processor 604 may be configured to enable LBS and data communications sessions using a single active data stack at any particular point in time. For example, the remote data module 622 and the remote data module 624 may be arranged to initiate and establish LBS communications sessions using the data stack 610 on the host processor 602. In such an embodiment, the LBS communications sessions may comprise remote LBS communications sessions with respect to the radio processor 604. In some implementations, the remote data module 622 may comprise a data socket interface (e.g., Microsoft® Windows® Sockets Winsock interface) configured or modified to use the data stack 610 on the host processor 602 for accessing network services.

The remote data module 624 may be arranged to receive one or more download/assist requests from the position engine extension 616 and/or the position engine 620. In some implementations, the position engine extension 616 may communicate a download/assist request such as an authentication download/assist or a geo-service download/assist request to the remote data module 624. In some implementations, such as when position information is not locally available or when not operating in a standalone mode, the position engine 620 may communicate a download/assist request such as a position information download/assist request to the remote data module 624.

In response to receiving the one or more download/assist requests, the remote data module 624 may be arranged to route one or more request/response messages to the remote data module 622 on the host processor 602. In various embodiments, the remote data module 622 on the host processor 602 may comprise an interface to a network entity, such as a PDE, for communicating request/response messages using the data stack 610 on the host processor 602. The PDE may comprise, for example, a location server such as an LPS or MPC configured to provide network-assistance to the mobile computing device 600 for authentication, authorization, geo-services, and/or position determination. In various embodiments, the remote data module 622 on the host processor 602 may comprise a PDE interface (e.g., LPS interface or MPC interface) for relaying an LBS communications session such as a GPS communications session (e.g., IS-801 message session) between the position engine extension 614 and/or the position engine 620 and the PDE using the data stack 610.

In various implementations, the request/response messages communicated to and from the PDE using the data stack 610 may comprise raw request/response data or parameters (e.g., authentication parameters, geo-service parameters, position parameters, etc.) for requesting and receiving network-assistance. In some implementations, the position engine extension 616 may be arranged to communicate with a PDE (e.g., LPS or MPC) using the data stack 610 of the host processor 602 according a suitable MS-PDE protocol through the remote data module 624 and the remote data module 622. In such implementations, the mobile computing device 600 may initiate and establish an LBS message session (e.g., IS-801 message session) with the PDE using the data stack 610 and obtain network assistance from the PDE for authentication, authorization, geo-services, and/or position determination.

In various embodiments, the information and/or network assistance received during an LBS session with a PDE using the data stack 610 is routed to the remote data module 624 on the radio processor 604 and is communicated within a download/assist response that fulfills a download/assist request from the position engine extension 616 and/or the position engine 620. The download/assist response may enable the position engine extension 616 and/or the position engine 620 to generate a location response that fulfills a location request from the LBS application 606. The position engine extension 616 and/or the position engine 620 may communicate the location response to the LBS API handler 614 which, in turn, may forward the location response to the LBS application 606 through the LBS API 612.

Figure 7:
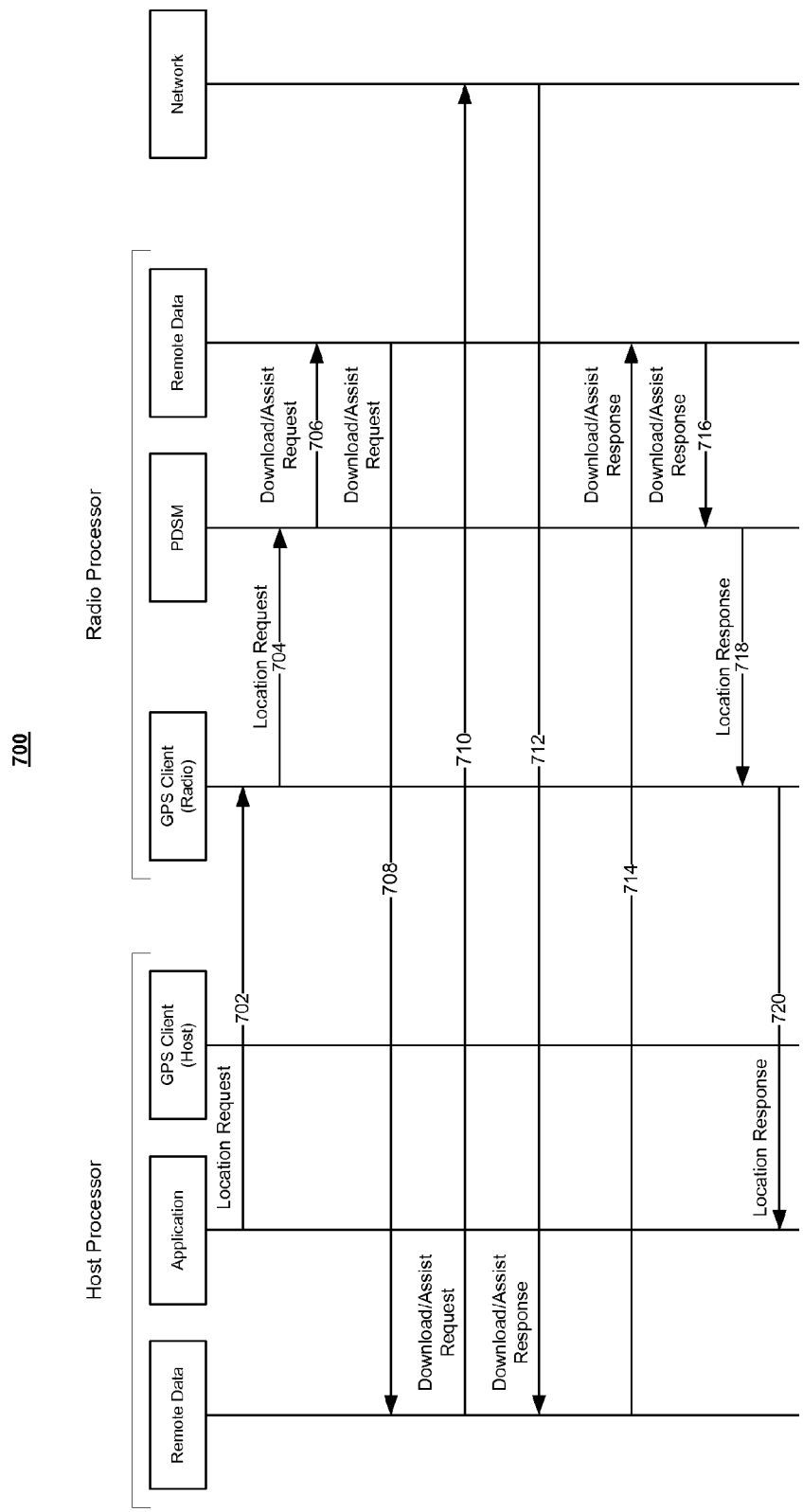
FIG. 7 illustrates a flow diagram in accordance with the mobile computing device of FIG. 6.

FIG. 7 illustrates one embodiment of a flow diagram 700 for enabling LBS and data communications sessions using a single active data stack at any particular point of time. The flow diagram 700 may be performed in accordance with the mobile computing device 600 of FIG. 6. The embodiments, however, are not limited in this context.

As shown in FIG. 7, an application (e.g., LBS application 606) invokes and communicates a location request 702 through a host GPS client (e.g., LBS API 612) implemented by a host processor (e.g., host processor 602) to a radio GPS client (e.g., LBS API handler 614) implemented by a radio processor (e.g., radio processor 604).

The radio GPS client forwards the location request 704 to a PDSM implemented on the radio processor. The PDSM may comprise, for example, one or more of a position engine extension (e.g., position engine extension 616), a position engine interface (e.g., position engine interface 618), and a position engine (e.g., position engine 620). The PDSM may be arranged to generate or obtain position information by performing one or more position determination techniques in one or more position determination modes.

As shown in FIG. 7, the PDSM communicates a download/assist request 706 such as an authentication download/assist request, a geo-services download/assist request, and/or a position information download/assist request to a remote data module (e.g., remote data module 624) implemented on the radio processor. The remote data module on the radio processor communicates a download/assist request 708 to a remote data module (e.g., remote data module 622) implemented on the host processor.

The remote data module on the host processor communicates a download/assist request 710 such as an authentication download/assist request, a geo-services download/assist request, and/or a position information download/assist request to a network entity such as PDE (e.g., LPS or MPC) configured to provide network assistance for authentication, authorization, geo-services, and/or position determination. The remote data module on the host processor then receives a download/assist response 712 from the network entity. In various embodiments, the remote data module on the host processor may communicate with the network entity using a data stack (e.g., data stack 610) implemented on the host processor.

The remote data module on the host processor then communicates a download/assist response 714 to the remote data module on the radio processor which, in turn, communicates a download/assist response 716 to the PDSM. The PDSM communicates a location response 718 to the radio GPS client. In response, the radio GPS client communicates the location response 720 to the host GPS client which, in turn, forwards the location response to the application. In various embodiments, the PDSM may be arranged to post-process the download/assist response data to determine a location response which fulfills the location request from the application. In an MS-based mode, the PDSM may be arranged to determine a location response with only limited periodic assistance from the network entity. In an MS-assisted mode, the network entity may determine and provide a location response to the PDSM through the exchange of assisting information.

Figure 8:
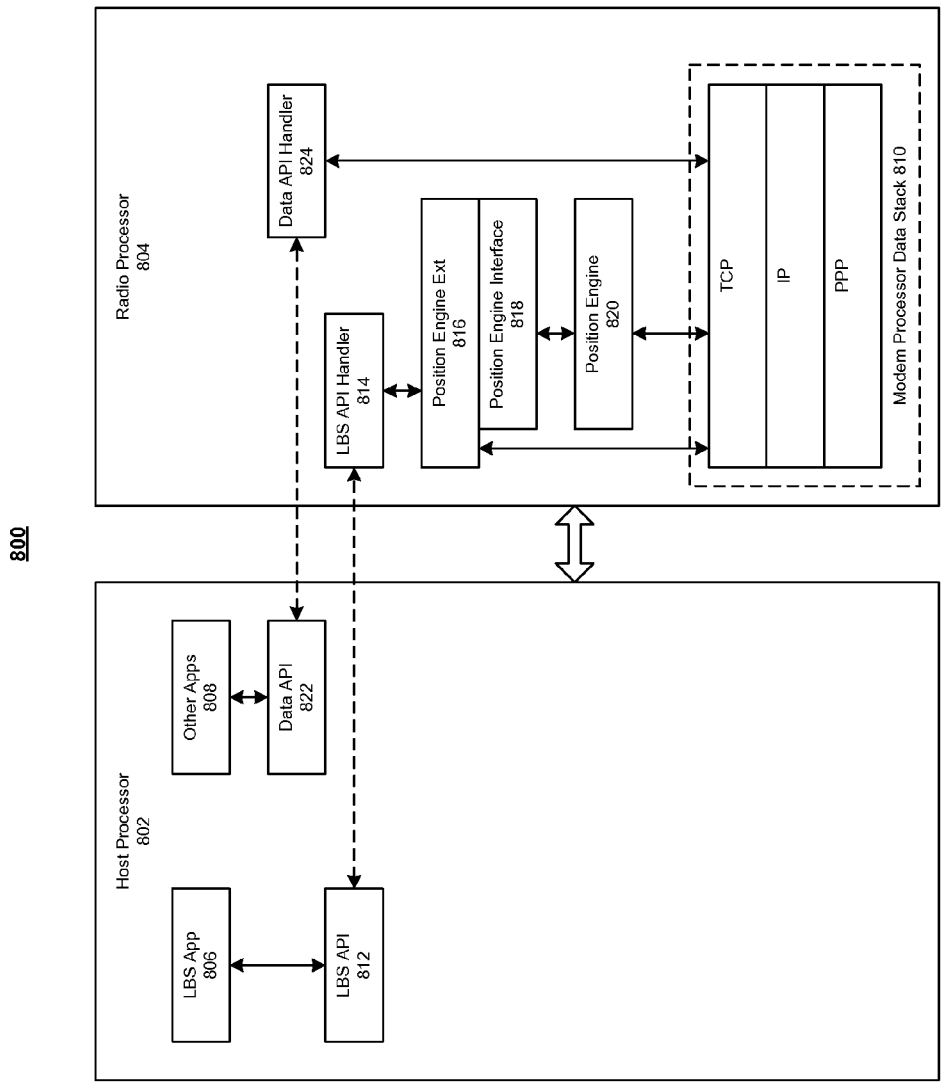
FIG. 8 illustrates a mobile computing device in accordance with one or more embodiments.

FIG. 8 illustrates a mobile computing device 800 in accordance with one or more embodiments. The mobile computing device 800 may be implemented as a smart phone arranged to provide voice and data communications functionality, as well as computing and processing capabilities. Although various elements and functions of the mobile computing device 800 may not be described in detail, it is to be understood that the mobile computing device 800 may implement any element or function described herein which is consistent with the described embodiments.

The mobile computing device 800 may comprise a dual processor architecture including a host processor 802 and a radio processor 804. The host processor 802 may comprise and/or implement at least one LBS application 806 and one or more other applications 808. The radio processor 804 may comprise and/or implement a data stack 810 including, for example, a TCP layer, an IP layer, and a PPP layer.

The host processor 802 and/or the radio processor 804 of the mobile computing device 800 may be configured to enable LBS and data communications sessions using a single active data stack at any particular point in time. For example, LBS and data communications sessions may be established using the data stack 810 of the radio processor 804. In such an embodiment, the data communications sessions may comprise remote data communications session with respect to the host processor 802. In this embodiment, a data stack implemented by the host processor 802 is not used for LBS or data communications sessions and may be omitted, removed, deactivated, and/or circumvented in the context of performing LBS or data communications sessions.

The host processor 802 may comprise an LBS API 812 (e.g., GPS API) arranged to allow communication of location requests and location responses between the LBS application 806 and one or more position determination programs implemented on the radio processor 804. In various embodiments, the LBS API 812 may comprise an interface to an LBS API handler 814 (e.g., GPS API handler) implemented on the radio processor 804. The LBS API handler 814 may be arranged to provide connectivity between the LBS API 812 and one or more position determination programs implemented on the radio processor 804 such as a position engine extension 816, a position engine interface 818, and a position engine 820 for allowing the exchange of location requests and location responses. In various implementations, the LBS API handler 814 may be configured to forward location requests received from the LBS application 806 through the LBS API 812 to one or more of the position engine extension 816, the position engine interface 818, and the position engine 820.

The position engine extension 816 may comprise a PDE (e.g., LPS and/or MPC) extension arranged to receive location requests from the LBS API handler 814 and to communicate with a PDE (e.g., LPS and/or MPC). In various embodiments, the position engine extension 816 may be arranged to communicate with the PDE according to a suitable MS-PDE protocol (e.g., MS-LPS or MS-MPC protocol) for authenticating and authorizing the mobile computing device 800 to receive network-assisted position determination and/or for requesting and receiving geo-service information.

The position engine interface 818 may comprise a position engine API and/or one or more position engine libraries used to generate one or more position fixes using the position engine 820. In various embodiments, the position engine interface 818 may be arranged to invoke a position fix by configuring the position engine 820 and requesting a position fix.

The position engine 820 may comprise a GPS engine arranged to provide position determination capabilities for the mobile computing device 800. In various embodiments, the position engine 820 may employ one or more position determination techniques such as GPS, CGI, CGI+TA, EFLT, TDOA, AOA, AFTL, OTDOA, EOTD, AGPS, GPS/AGPS, hybrid techniques, and so forth. The position engine 820 may be arranged to operate in one or more position determination modes including a standalone mode, an MS-assisted mode, and an MS-based mode.

In various embodiments, the position engine extension 816 and/or the position engine 820 may be arranged to download and/or request network assistance from a PDE (e.g., LPS or MPC) using the data stack 810 in response to a location request from the LBS application 806. In some implementations, the position engine extension 816 may download and/or request network assistance from a PDE for authenticating the mobile computing device 800 and/or the LBS application 806. In some implementations, the position engine extension 816 may download and/or request network assistance from a PDE for receiving one or more geo-services. In some implementations, the position engine 820 may download and/or request network assistance from a PDE for generating and/or obtaining position information for the mobile computing device 800.

In various embodiments, the information and/or network assistance received during an LBS session with a PDE using the data stack 810 may enable the position engine extension 816 and/or the position engine 820 to generate a location response that fulfills a location request from the LBS application 806. The position engine extension 816 and/or the position engine 820 may communicate the location response to the LBS API handler 814 which, in turn, may forward the location response to the LBS application 806 through the LBS API 812.

As shown in FIG. 8, the host processor 802 may comprise or implement a data API 822. In various embodiments, the data API 822 may comprise an interface to a data API handler 824 implemented on the radio processor 804 for allowing the exchange of data requests and data responses.

In various embodiments, the data API 822 on the host processor 802 and the data API handler 824 on the radio processor 804 may comprise be configured to enable data communications sessions other than LBS using a single active data stack at any particular point in time. For example, the data API 822 and the data API handler 824 may be arranged to initiate and establish one or more data communications session using the data stack 810 on the radio processor 804. In such an embodiment, the data communications sessions may comprise remote data communications session with respect to the host processor 802. In some implementations, the data API handler 824 may comprise a data socket interface (e.g., Microsoft® Windows® Sockets Winsock interface) configured or modified to use the data stack 810 on the radio processor 804 for accessing network services.

In this embodiment, the other applications 808 (e.g., messaging application, web browser application, and/or other client application) executed by the host processor 802 may be arranged to initiate and perform one or more communications sessions such as a data communications session using the data stack 810. In various implementations, the other applications 808 may perform data communications sessions using the data stack 810 through the data API 822 on the host processor 802 and the data API handler 824 on the radio processor 804. In this embodiment, the LBS application 806 and the other applications 808 may coexist without requiring data preemption.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary components or modules performing various operations, it can be appreciated that the operations performed by such components or modules may be combined and/or separated for a given implementation and may be performed by a greater number or fewer number of components or modules. It also is to be appreciated that such components or modules may be implemented by one or more hardware components, software components, and/or combination thereof.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
   a wireless computing device comprising a combination handheld computer and mobile telephone,
   the device comprising:
     a host processor having a first data stack and a remote location-based services (LBS) application programming interface (API); and
     a radio processor having a second data stack and an API handler, wherein the radio processor is responsible for performing voice and data communications operations including transmitting and receiving voice and data information over one or more wireless communication channels, the remote API to interface with the API handler and to communicate with one or more position determination programs implemented on the radio processor, wherein the one or more position determination programs employ one or more position determination techniques including a Global Positioning System (GPS) technique, the wireless computing device to establish at least one of a LBS communications session and a data communications session using a single active one of the first data stack and the second data stack implemented by at least one of the host processor and the radio processor at any particular point in time, the first data stack to support LBS and data communications sessions, the position determination programs comprising at least a position engine that operates in one or more modes including a standalone mode, the host processor comprising at least one LBS application to initiate the LBS communications session, and the LBS application to provide data to the position engine for hiding the first position fix when operating in the standalone mode.

2. The apparatus of claim 1, the active data stack to communicate over a cellular network with a position determination entity (PDE).

3. The apparatus of claim 1, the LBS communications session comprising GPS communications session.

4. The apparatus of claim 1, the host processor further comprising at least one other application to initiate the data communications session.

5. The apparatus of claim 1, the position determination programs further comprising one or more of a position engine interface and a position engine extension.

6. The apparatus of claim 5, the position engine further operates in one or more of a mobile station (MS) assisted mode and an MS-based mode.

7. An apparatus comprising:
a wireless computing device comprising a combination handheld computer and mobile telephone, the device including a host processor having a first data stack and a radio processor having a second data stack, wherein the radio processor is responsible for performing voice and data communications operations including transmitting and receiving voice and data information over one or more wireless communication channels, the wireless computing device to establish at least one of a location-based services (LBS) communications session and a data communications session using a single active one of the first data stack and the second data stack implemented by at least one of the host processor and the radio processor at any particular point in time, the first data stack to support LBS and data communications sessions;

at least one remote data module and the LBS communications sessions using the first data stack are established through the remote data module; and one or more of a data API and a data API handler to establish communications sessions to provide access to one or more position determination programs implemented on the radio processor, wherein the one or more position determination programs employ one or more position determination techniques including a Global Positioning System (GPS) technique, the position determination programs comprising at least a position engine that operates in one or more modes including a standalone mode, the host processor comprising at least one LBS application to initiate the LBS communications session, and the LBS application to provide data to the position engine for hiding the first position fix when operating in the standalone mode.

8. The apparatus of claim 7, the second data stack to support LBS and data communications sessions.

9. The apparatus of claim 8, the data communications sessions using the second data stack are established through one or more of the data API and the data API handler.

10. A method comprising:
communicating a location request through a location-based services (LBS) application programming interface (API) implemented by a host processor to a LBS API handler implemented by a radio processor, wherein the radio processor is responsible for performing voice and data communications operations including transmitting and receiving voice and data information over one or more wireless communication channels;

communicating a preempt request from the radio processor to the host processor to preempt data sessions using a data stack implemented by the host processor;

establishing a LBS communications session to a network entity to provide access to one or more position determination programs implemented on the radio processor, wherein the one or more position determination programs employ one or more position determination techniques including a Global Positioning System (GPS) technique; and canceling preemption of the data sessions using the data stack implemented by the host processor in response to termination of the LBS communication session, the position determination programs comprising at least a position engine that operates in one or more modes including a standalone mode, the host processor comprising at least one LBS application to initiate the LBS communications session, and the LBS application to provide data to the position engine for hiding the first position fix when operating in the standalone mode.

11. The method of claim 10, further comprising communicating a preempt request to a data preemption module implemented by the radio processor in response to invocation of an LBS communication session by the LBS API.

12. The method of claim 10, further comprising preventing new data sessions using the data stack of the host processor from being established until termination of the LBS communications session.

13. A method comprising:
communicating a data request to a radio processor comprising a data stack used to establish a location-based services (LBS) communications session, wherein the radio processor is responsible for performing voice and data communications operations including transmitting and receiving voice and data information over one or more wireless communication channels;

establishing a data communications session other than an LBS communications session to provide access to one or more position determination programs implemented on the radio processor, wherein the one or more position determination programs employ one or more position determination techniques including a Global Positioning System (GPS) technique; and communicating the data request through a first data API implemented by a host processor to a second data API handler implemented by the radio processor, the position determination programs comprising at least a position engine that operates in one or more modes including a standalone mod;

the host processor comprising at least one LBS application to initiate the LBS communications session, and the LBS application to provide data to the position engine for hiding the first position fix when operating in the standalone mode.

14. The method of claim 13, further comprising sharing the data stack on the radio processor with the LBS application.

15. A non-transitory machine-readable storage medium comprising instructions that if executed enable a computing system to:

communicate a location request through a location-based services (LBS) application programming interface (API) implemented by a host processor to LBS API handler implemented by a radio processor, wherein the radio processor is responsible for performing voice and data communications operations including transmitting and receiving voice and data information over one or more wireless communication channels;

communicate a preempt request from the radio processor to the host processor to preempt data sessions using a data stack implemented by the host processor;

establish a location-based services (LBS) communications session to a network entity to provide access to one or more position determination programs implemented on the radio processor, wherein the one or more position determination programs employ one or more position determination techniques including a Global Positioning System (GPS) technique; and cancel preemption of the data sessions using the data stack implemented by the host processor in response to termination of the LBS communication session, the position determination programs comprising at least a position engine that operates in one or more modes including a standalone mode, the host processor comprising at least one LBS application to initiate the LBS communications session, and the LBS application to provide data to the position engine for hiding the first position fix when operating in the standalone mode.

16. The non-transitory machine-readable storage medium of claim 15, further comprising instructions that if executed enable a computing system to communicate a preempt request to a data preemption module implemented by the radio processor in response to invocation of an LBS communication session by the LBS API.

17. The non-transitory machine-readable storage medium of claim 15, further comprising instructions that if executed enable a computing system to prevent new data sessions using the data stack of the host processor from being established until termination of the LBS communications session.

18. A non-transitory machine-readable storage medium comprising instructions that if executed enable a computing system to:

communicate a data request to a radio processor comprising a data stack used to establish a location-based services (LBS) communications session, wherein the radio processor is responsible for performing voice and data communications operations including transmitting and receiving voice and data information over one or more wireless communication channels; and establish a data communications session other than an LBS communications session to provide access to one or more position determination programs implemented on the radio processor, wherein the one or more position determination programs employ one or more position determination techniques including a Global Positioning System (GPS) technique; and communicate the data request through a first data API implemented by a host processor to a second data API handler implemented by a radio processor, the position determination programs comprising at least a position engine that operates in one or more modes including a standalone mode, the host processor comprising at least one LBS application to initiate the LBS communications session, and the LBS application to provide data to the position engine for hiding the first position fix when operating in the standalone mode.

19. The non-transitory machine-readable storage medium of claim 18, further comprising instructions that if executed enable sharing of the data stack on the radio processor with the LBS application.

* * * * *